US008497916B2

United States Patent
Ogura

(10) Patent No.: US 8,497,916 B2
(45) Date of Patent: Jul. 30, 2013

(54) IMAGE CAPTURE DEVICE CHANGING CROPPING RANGE OF IMAGE BASED ON MAGNITUDE OF SHAKE OF THE DEVICE, IMAGE GENERATING METHOD, AND COMPUTER PROGRAM THEREOF

(75) Inventor: Motonori Ogura, Osaka (JP)

(73) Assignee: Panasonic Corporation, Osaka (JP)

( * ) Notice: Subject to any disclaimer, the term of this patent is extended or adjusted under 35 U.S.C. 154(b) by 209 days.

(21) Appl. No.: 13/151,411

(22) Filed: Jun. 2, 2011

(65) Prior Publication Data

US 2012/0081558 A1   Apr. 5, 2012

(30) Foreign Application Priority Data

Jun. 4, 2010   (JP) ................................ 2010-128544

(51) Int. Cl.
*H04N 5/228*   (2006.01)
(52) U.S. Cl.
USPC ................. 348/208.6; 348/208.4; 348/208.13
(58) Field of Classification Search
USPC ............... 348/208.4, 208.6, 208.13
See application file for complete search history.

(56) References Cited

U.S. PATENT DOCUMENTS

2005/0100319 A1*   5/2005   Saed ............................... 386/69
2008/0151062 A1*   6/2008   Okumura ................... 348/208.1

FOREIGN PATENT DOCUMENTS

JP   2009-272890   11/2009

* cited by examiner

*Primary Examiner* — Usman Khan
(74) *Attorney, Agent, or Firm* — Renner, Otto, Boisselle & Sklar, LLP

(57) ABSTRACT

An image capture device includes: an optical system for producing a subject image; an imager, which receives the subject image and outputs a signal representing an image including the subject image; a sensor for detecting the shake of the device itself by the movement of the device; and an image processing section, which receives the signal representing the image and crops and outputs a part of the image and which changes the cropping range of the image, thereby reducing the shakiness of the subject image in the image that has been caused by the shake of the device itself. The image processing section determines whether the cropping range of the image needs to be changed based on the shake of the device itself that has been detected by the sensor or based on the motion of the subject image.

10 Claims, 7 Drawing Sheets

(a) BASE FRAME (IMAGE AT TIME t)   (b) REFERENCE FRAME (IMAGE AT TIME t+Δt)

(a)

(b)

(c)

(d)

IMAGE CAPTURE DEVICE CHANGING CROPPING RANGE OF IMAGE BASED ON MAGNITUDE OF SHAKE OF THE DEVICE, IMAGE GENERATING METHOD, AND COMPUTER PROGRAM THEREOF

BACKGROUND OF THE INVENTION

1. Field of the Invention

The present invention relates to an image capture device and more particularly relates to an image capture device with an optical image stabilization (OIS) function.

2. Description of the Related Art

Japanese Patent Application Laid-Open Publication No. 2009-272890 discloses a digital camcorder with two different kinds of OIS functions, one of which is an optical one and the other an electronic one. That digital camcorder senses its own shake by using an angular velocity sensor, and then compensates for its own shake by using both of the optical and electronic OIS functions in combination.

As a result, that digital camcorder achieves a significantly larger angle of stabilization, and therefore, can stabilize the image sufficiently even if the shake has great amplitude.

However, the digital camcorder disclosed in Japanese Patent Application Laid-Open Publication No. 2009-272890 realizes the optical and electronic OIS functions by always using the angular velocity sensor to sense its own shake. That is why the precision of stabilization solely depends on the sensibility of the angular velocity sensor. More specifically, the digital camcorder disclosed in Japanese Patent Application Laid-Open Publication No. 2009-272890 cannot sense its own subtle shake accurately enough to go beyond the limit of sensibility of the angular velocity sensor. Consequently, such a digital camcorder cannot accurately compensate for the image shakiness caused by that subtle shake.

FIG. 9(a) illustrates the waveform of a shake actually given to a digital camcorder. In FIG. 9(a), the abscissa represents the time and the ordinate represents the angular velocity to cancel the shake. It can be seen that a shake waveform with relatively low frequencies and a shake waveform with relatively high frequencies are superposed one upon the other in this waveform. It is only natural because when a digital camcorder is given a shake, high frequency components will represent a shake caused by hand or body tremors with small amplitudes and low frequency components will represent a shake caused by such tremors with bigger amplitudes, generally speaking.

On the other hand, FIG. 9(b) illustrates the waveform of a shake that has been sensed by the angular velocity sensor in the digital camcorder. This is a waveform corresponding to the low-frequency shake waveform shown in FIG. 9(a) and not including the high-frequency shake waveform. This is because the sensibility of the angular velocity sensor is not high enough to detect the high-frequency shake waveform. It should be noted that even if the angular velocity sensor could obtain such a high-frequency shake waveform, the amplitude of that waveform would be approximately equal to that of noise components that affect a signal indicating the sensing result obtained by the angular velocity sensor. For that reason, actually it should be difficult for another signal processor, which receives the output signal of the angular velocity sensor, to distinguish such a high-frequency shake waveform from the noise components.

FIG. 9(c) shows what waveform will be generated if the waveform shown in FIG. 9(a) is corrected based on the sensing result obtained by the angular velocity sensor. It can be seen that the corrected waveform is not quite flat and that the high-frequency shake waveform still remains partially.

In conventional digital camcorders, the influence of such high-frequency shake on the image quality of the video shot has not been considered to be important. This is because the sensitivities and resolutions of conventional imagers have been too low to cause a sensible influence on the image quality for general users.

Recently, however, as the sensitivities and resolution of imagers have been more and more increased and as the performance of lenses has been further improved, the influence of such a high-frequency shake on the image quality of video shot has become more and more easily sensible.

SUMMARY OF THE INVENTION

It is therefore an object of the present invention to provide a technique for accurately compensating for even such a subtle shake.

An image capture device according to the present invention includes: an optical system for producing a subject image; an imager, which receives the subject image and outputs a signal representing an image including the subject image; a sensor for detecting shake of the device itself by the movement of the device; and an image processing section, which receives the signal representing the image and crops and outputs a part of the image and which changes a cropping range of the image, thereby reducing shakiness of the subject image in the image that has been caused by the shake of the device itself. According to magnitude of the shake of the device itself that has been detected by the sensor, the image processing section determines whether the cropping range of the image needs to be changed based on the shake of the device itself that has been detected by the sensor or based on the motion of the subject image.

If the shake of the device itself that has been detected by the sensor is greater than a predetermined value, the image processing section may change the cropping range of the image based on the shake of the device itself that has been detected by the sensor. If the shake of the device itself that has been detected by the sensor is equal to or smaller than the predetermined value, the image processing section may change the cropping range of the image based on the motion of the subject image.

If the shake of the device itself that has been detected by the sensor is equal to or smaller than the predetermined value, the imager may output signals representing a plurality of images, and the image processing section may detect the motion of the subject image using the plurality of images and may change the cropping range of the image based on the motion of the subject image.

The image capture device may further include a control section that determines, by the motion of the subject image and based on the shake of the device itself that has been detected by the sensor, whether the image processing section needs to perform the processing of reducing the shakiness of the subject image in the image.

If the shake of the device itself that has been detected by the sensor is greater than the predetermined value, the imager may output signals representing a plurality of images, and the image processing section may detect the motion of the subject image using the plurality of images and may change the cropping range of the image based on not only the shake of the device itself that has been detected by the sensor but also the motion of the subject image.

The image capture device may further include a stabilizer that performs the processing of reducing the shakiness of the subject image in the image that has been caused by the shake of the device itself by shifting an optical axis of the optical system based on the shake of the device itself that has been detected by the sensor.

An image generating method according to the present invention is a method for generating an image by using an image capture device that includes an optical system, an imager and a sensor. The method includes the steps of: producing a subject image using the optical system; receiving the subject image at the imager and generating a signal representing an image including the subject image; detecting shake of the image capture device by the movement of the device itself using the sensor; and reducing shakiness of the subject image in the image that has been caused by the shake of the device itself and outputting the subject image by changing a cropping range of the image generated. The step of reducing the shakiness of the subject image includes determining, according to magnitude of the shake of the image capture device itself that has been detected by the sensor, whether the cropping range of the image needs to be changed based on the shake of the device itself that has been detected by the sensor or based on the motion of the subject image.

A computer program according to the present invention is stored on a storage medium so as to be executed by a computer of an image capture device that includes an optical system, an imager and a sensor. The computer program is defined to make the computer that executes the computer program perform the steps of: producing a subject image using the optical system; receiving the subject image at the imager and generating a signal representing an image including the subject image; detecting shake of the image capture device by a movement of the device itself using the sensor; and reducing shakiness of the subject image in the image that has been caused by the shake of the device itself and outputting a less shaky subject image by changing a cropping range of the image generated. The step of reducing the shakiness of the subject image includes determining, according to magnitude of the shake of the image capture device itself that has been detected by the sensor, whether the cropping range of the image needs to be changed based on the shake of the device itself that has been detected by the sensor or based on the motion of the subject image.

The present invention provides a technique for accurately compensating for a subtle shake.

DETAILED DESCRIPTION OF PREFERRED EMBODIMENTS

The present invention is implemented as an electronic device with an image capturing function, or an image capture device. Examples of such electronic devices include digital camcorders, digital still cameras, and cellphones with a built-in camera. A computer program for operating such an electronic device and a storage medium that stores the computer program also fall within the scope of the present invention.

Hereinafter, preferred embodiments of an image capture device according to the present invention will be described with reference to the accompanying drawings. In the preferred embodiments to be described below, the electronic device of the present invention is supposed to be a digital camcorder.

1. Configuration

Hereinafter, the configuration of a digital camcorder as a specific preferred embodiment of the present invention will be described with reference to FIG. 1.

Figure 1:
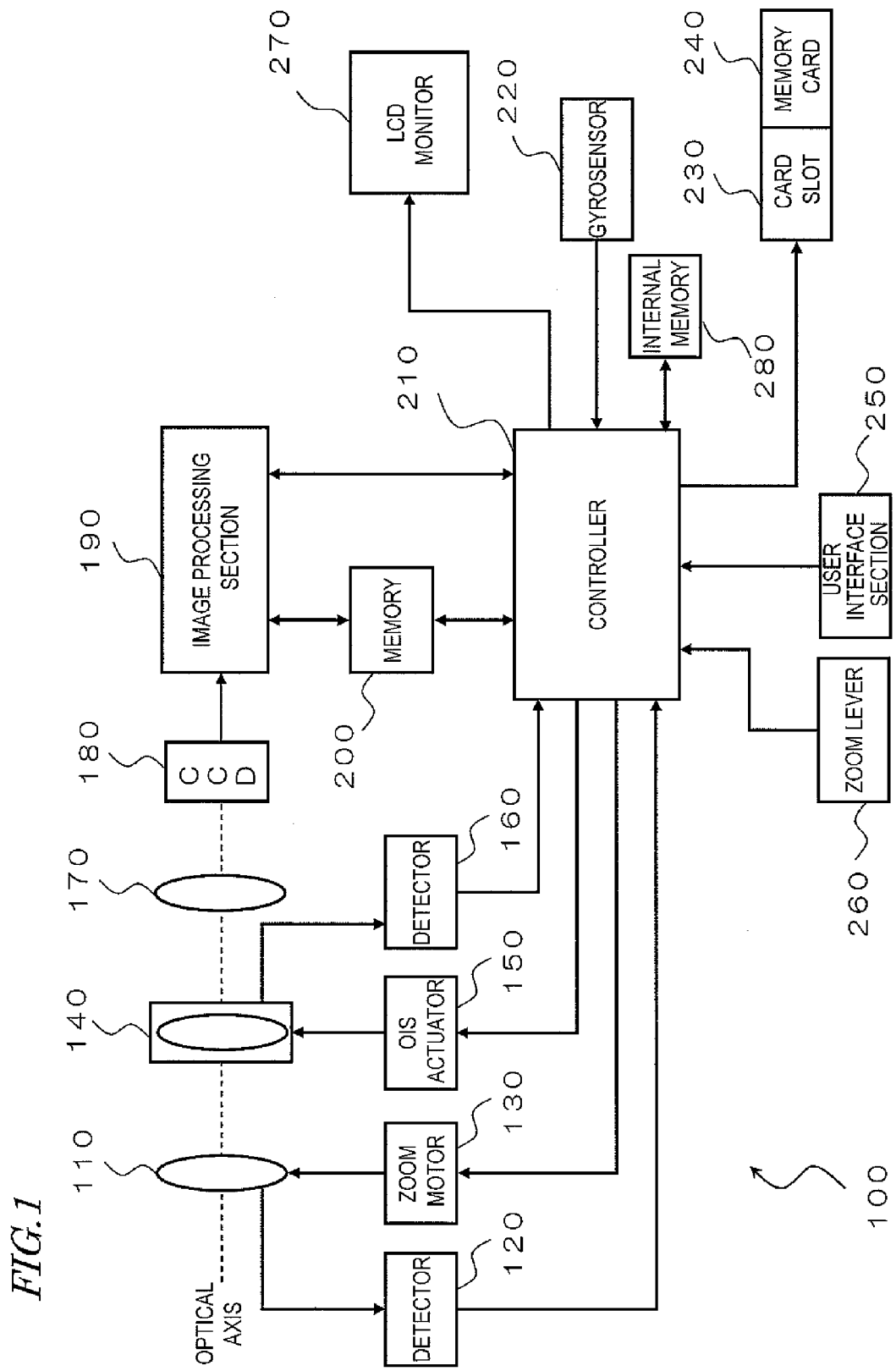
FIG. 1 is a block diagram illustrating a configuration for a digital camcorder 100.

FIG. 1 is a block diagram illustrating a configuration for the digital camcorder 100. This digital camcorder 100 is designed to make a CCD image sensor 180 (which will be sometimes simply referred to herein as an "imager") capture a subject image that has been produced by an optical system including a zoom lens 110. The video data that has been generated by the CCD image sensor 180 is subjected by an image processing section 190 to various kinds of processing and then stored in a memory card 240. If necessary, the video data stored in the memory card 240 can be displayed on an LCD monitor 270. Hereinafter, the configuration of this digital camcorder 100 will be described in further detail.

The optical system of this digital camcorder 100 is made up of the zoom lens 110, an optical image stabilizer (OIS) 140, and a focus lens 170. The zoom lens 110 moves along the optical axis of the optical system and thereby zooms in on, or out, the subject image. The focus lens 170 moves along the optical axis of the optical system, thereby adjusting the focal length to the subject.

The OIS 140 includes a stabilizer lens that can move internally within a plane that intersects with the optical axis at right angles. Specifically, in the OIS 140, the stabilizer lens is driven in such a direction as to cancel the shake of the digital camcorder 100, thereby reducing the shakiness of the subject image.

The zoom motor 130 drives the zoom lens 110. The zoom motor 130 may be implemented as a pulse motor, a DC motor, a linear motor or a servo motor, for example. If necessary, the zoom motor 130 may drive the zoom lens 110 via a cam mechanism, a ball screw, or any other appropriate mechanism. A detector 120 detects the position of the zoom lens 110 on the optical axis. As the zoom lens 110 moves in the optical axis direction, the detector 120 outputs a signal representing the position of the zoom lens through a switch such as a brush.

The OIS actuator 150 drives the stabilizer lens in the OIS 140 within a plane that intersects with the optical axis at right angles. The OIS actuator 150 may be implemented as a planar coil or an ultrasonic motor. A detector 160 senses how much the stabilizer lens has moved in the OIS 140.

The CCD image sensor 180 captures the subject image, which has been produced by the optical system including the zoom lens 110, thereby generating video data. The CCD image sensor 180 performs exposure, transfer, electronic shuttering and various other kinds of operations.

The optical system and the image sensor 180 are used to capture an image and will sometimes be collectively referred to herein as an "image capturing section".

The image processing section 190 subjects the video data that has been generated by the CCD image sensor 180 to various kinds of processing. For example, the image processing section 190 processes the video data that has been generated by the CCD image sensor 180, thereby generating either video data to be displayed on the LCD monitor 270 or video data to be stored back into the memory card 240 again. The image processing section 190 may also subject the video data that has been generated by the CCD image sensor 180 to gamma correction, white balance correction, flaw correction and various other sorts of processing. Furthermore, the image processing section 190 also compresses the video data that has been generated by the CCD image sensor 180 in a compression format compliant with the H.264 standard or the MPEG-2 standard. The image processing section 190 may be implemented as a DSP or a microcomputer but its functions may also be performed by a combination of hardware and software.

The controller 210 performs an overall control on all of these components of the digital camcorder 100. The controller 210 may be implemented as a semiconductor device, for example, but could also be implemented as either only a single piece of hardware or a combination of hardware and software. For example, the controller 210 could be a microcomputer.

A memory 200 functions as a work memory for the image processing section 190 and the controller 210, and may be implemented as a DRAM or a ferroelectric memory, for example.

The LCD monitor 270 can display an image represented by the video data that has been generated by the CCD image sensor 180 and an image represented by the video data that has been retrieved from the memory card 240.

The gyrosensor 220 may be implemented as a kind of vibrating member such as a piezoelectric transducer. Specifically, the gyrosensor 220 vibrates the vibrating member such as a piezoelectric transducer at a constant frequency and transforms the Coriolis force produced into a voltage, thereby obtaining angular velocity information. Then, the controller 210 gets the angular velocity information from the gyrosensor 220 and gets the stabilizer lens driven in the OIS in such a direction that will cancel that shake. As a result, the shake of the digital camcorder 100 that has been generated by the user's hand or body tremors can be canceled.

In this preferred embodiment, a gyro signal (i.e., the angular velocity information) supplied from the gyrosensor 220 is supposed to be used. However, this is only an example. Alternatively, the gyrosensor 220 may be replaced with an angular velocity sensor or an acceleration sensor. In any case, the replacement sensor needs to have a sensing function for detecting the shake of the image capture device itself based on the movement of the device.

The memory card 240 can be readily inserted into, or removed from, this digital camcorder 100 through a card slot 230, which is connectible both mechanically and electrically to the memory card 240. The memory card 240 includes a flash memory or a ferroelectric memory inside, and can store data.

An internal memory 280 may be a flash memory or a ferroelectric memory, for example, and stores a control program for performing an overall control on this digital camcorder 100. The controller 210 and/or the image processing section 190 can carry out the processing shown in FIG. 6 (to be described later) by performing part or all of that control program.

A user interface section 250 is a member for accepting the user's instruction to capture an image. A zoom lever 260 is a member for accepting the user's instruction to change the zoom power.

2. Optical Image Stabilization

The digital camcorder 100 of this preferred embodiment has an optical image stabilization (OIS) function, which is used to reduce the influence of the shake of the device itself (i.e., so-called "camera shake") on the image shot.

To reduce the influence of the camera shake on the image shot, first of all, the digital camcorder 100 detects its own shake by one of the following two methods. Specifically, according to one of the two methods, the angular velocity is detected using the gyrosensor 220. The other method is a motion detection method, in which the motion of the subject image is detected based on a number of images shot and detected as the camera shake.

Also, to minimize the influence of the camera shake on the image shot, the digital camcorder 100 cancels the detected shake by an optical or electronic image stabilization method.

Hereinafter, those two shake detecting methods and those two image stabilization methods (will also be referred to herein as "shake canceling methods") will be described.

[2-1. Shake Detecting Methods]

First of all, the camera shake detecting methods will be described.

2-1-1. Shake Detection Using Gyrosensor 220

Figure 2:
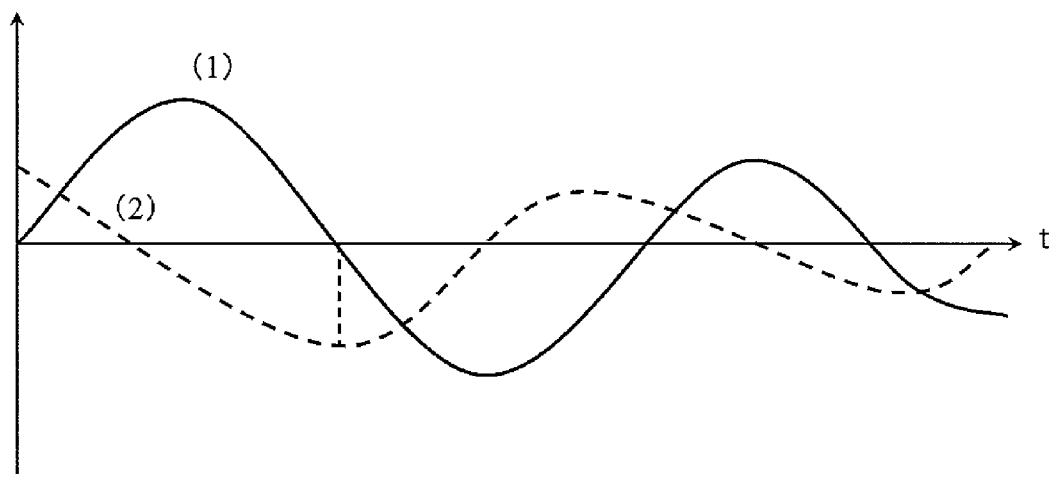
FIG. 2 is a schematic representation illustrating how to detect a shake using a gyrosensor 220.

Hereinafter, it will be described with reference to FIG. 2 how to detect a shake by using the gyrosensor 220. FIG. 2 is a schematic representation illustrating how to detect a shake with the gyrosensor 220.

The gyrosensor 220 outputs an electrical signal representing the magnitude of the camera shake, which will be referred to herein as a "gyro signal" that is equivalent to the angular velocity information mentioned above.

Figure 9:
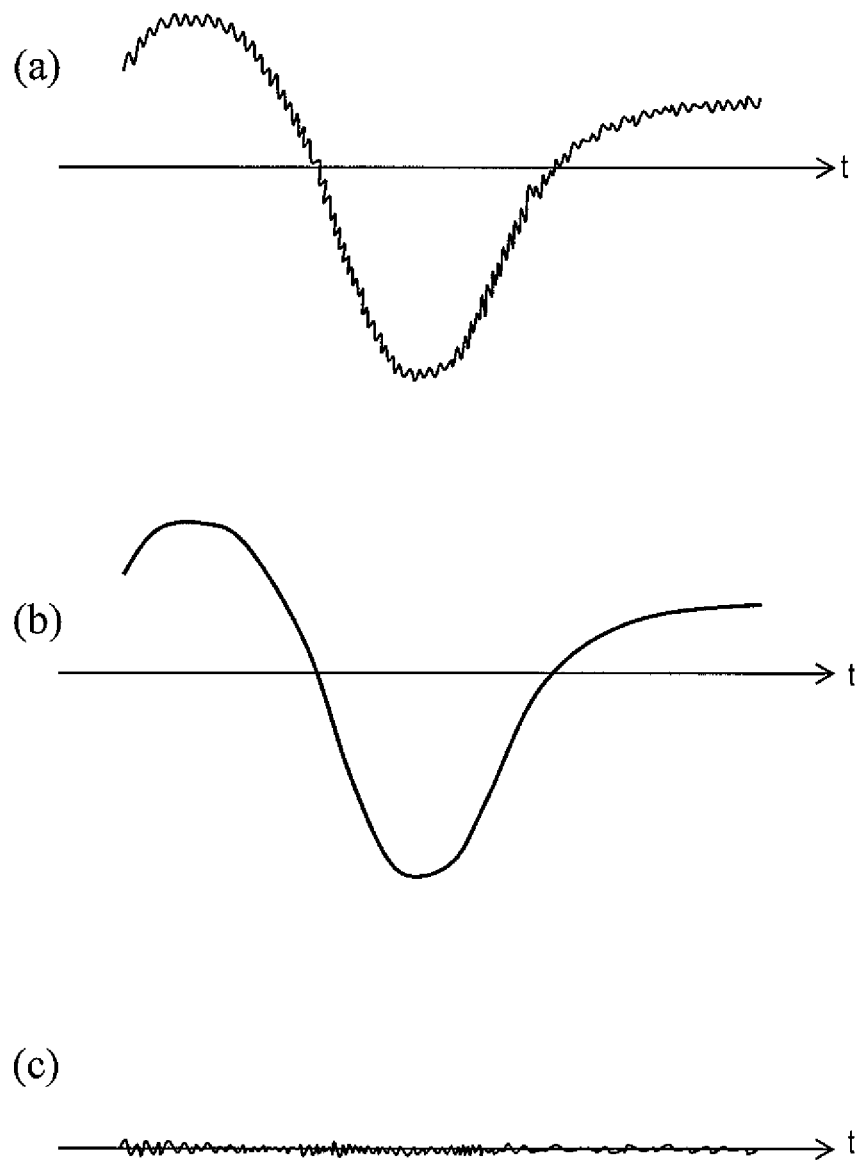
FIG. 9(a) illustrates the waveform of a shake actually given to a digital camcorder.
FIG. 9(b) illustrates the waveform of a shake that has been sensed by the angular velocity sensor in the digital camcorder.
FIG. 9(c) shows what waveform will be generated if the waveform shown in FIG. 9(a) is corrected based on the sensing result obtained by the angular velocity sensor.

FIG. 2 illustrates a waveform (1) indicating the angle of the shake that has been given to the device itself and the waveform (2) of the gyro signal representing the angular velocity of the camera shake that has been detected by the gyrosensor 220. It should be noted that the gyro signal output by the gyrosensor 220 consists of only a waveform representing a shake with relatively low frequencies, which is only a part of the shake actually given to the device, and does not include a waveform representing a shake with relatively high frequencies as already described with reference to FIG. 9.

The controller 210 performs an integration operation on the gyro signal supplied from the gyrosensor 220, thereby calculating the angle of the shake. And based on the result of this computation, the controller 210 determines how much the OIS actuator 150 needs to be driven.

2-1-2. Motion Detection Based on Images Shot

Figure 3:
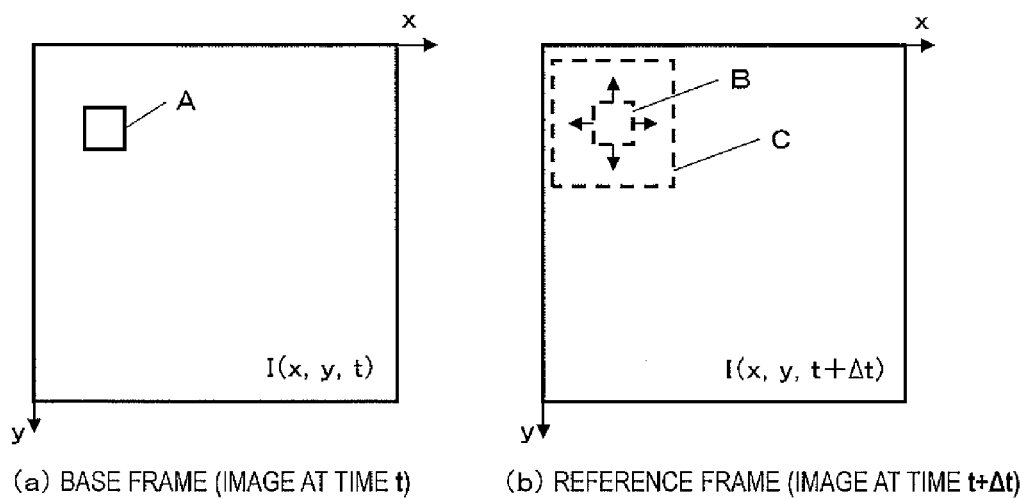
FIGS. 3(a) and 3(b) respectively illustrate a base frame and a reference frame for use to estimate a motion by block matching.
Figure 4:
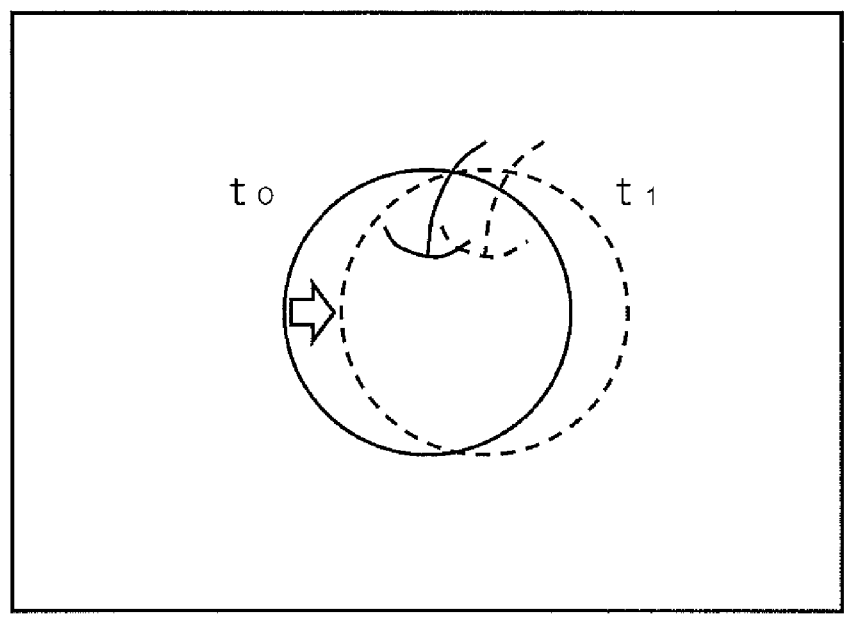
FIG. 4 illustrates an exemplary method for estimating a motion vector.

Next, it will be described with reference to FIGS. 3 and 4 how to detect a motion based on the images shot. FIGS. 3 and 4 are schematic representations illustrating such a motion detection method using images shot.

The image processing section 190 detects the motion of the images shot (as an optical flow) by a known technique such as block matching, gradient method, and phase correlation method.

The image processing section 190 can calculate the difference between those images shot. Specifically, the image processing section 190 calculates the difference between one image shot (i.e., a base frame) and another image (i.e., a reference frame) that has been shot after the former image.

FIGS. 3(a) and 3(b) respectively illustrate a base frame and a reference frame for use to detect a motion by block matching. Specifically, the image processing section 190 sets a window area A shown in FIG. 3(a) in the base frame (i.e., a picture in question at a time t, from which the motion needs to be detected), and then searches the reference frame for a pattern that is similar to the pattern inside the window area. As the reference frame, the frame that follows the base frame is often used.

As shown in FIG. 3(b), the search range is usually defined to be a predetermined range (which is identified by C in FIG. 3(b)) with respect to a point B, at which the magnitude of motion is zero. Also, the degree of similarity between the patterns is estimated by calculating, as an estimate, either the sum of squared differences (SSD) or the sum of absolute differences (SAD). As a result of the computation, the image processing section 190 generates, as the motion that has been detected based on the images shot, the direction and magnitude of the motion (which are collectively called a "motion vector").

Then the image processing section 190 outputs the motion vector thus calculated to the controller 210, which senses, by the motion vector, the direction and magnitude of the motion between the images. That is to say, the controller 210 senses the direction and magnitude of the camera shake based on the motion vector.

Next, it will be described with reference to FIG. 4 specifically how to detect a motion vector. FIG. 4 illustrates an exemplary method for detecting a motion vector. In FIG. 4, the subject image drawn in the solid line is included in an image that was shot at a time t0, while the subject image drawn in the dashed line is included in an image that was shot at a time t1. In this example, the window area is supposed to be set on the subject illustrated for the sake of simplicity of description. And the subject image drawn in the solid line is supposed to have moved 10 pixels rightward and turned into the subject image drawn in the dashed line.

The image at the time t1 was shot ⅟₆₀ seconds after the time t0. The image processing section 190 calculates the difference between those two images that were shot at the times t0 and t1, respectively. As a result, the image processing section 190 determines that the image moved rightward and the magnitude of the motion is 10 pixels. Then, the image processing section 190 outputs a motion vector thus calculated to the controller 210. In response, the controller 210 senses, based on the motion vector obtained, that the device has shaken 10 pixels leftward. This decision is made because since it has been discovered that the image moved 10 pixels rightward, the device moved in the opposite direction.

[2-2. Shake Canceling Methods]

Next, the methods for reducing the influence of the camera shake on the image shot will be described.

2-2-1. Optical Image Stabilization

The optical image stabilization is a method for reducing the influence of a camera shake on an image shot by shifting the optical axis of the optical system according to the magnitude and direction of the camera shake. As described above, the digital camcorder 100 has the OIS 140. Thus, the digital camcorder 100 drives the OIS 140 and shifts the optical axis of the optical system so as to cancel the camera shake. In this manner, the digital camcorder 100 can reduce the influence of its own shake on an image shot.

2-2-2. Electronic Image Stabilization

Next, the electronic image stabilization will be described with reference to FIG. 5, which is a schematic representation illustrating how to make the electronic image stabilization. This is a method for reducing the influence of a camera shake on an image shot by changing the cropping range on the image shot according to the magnitude and direction of the camera shake.

A specific example will be described with reference to FIG. 5.

Figure 5:
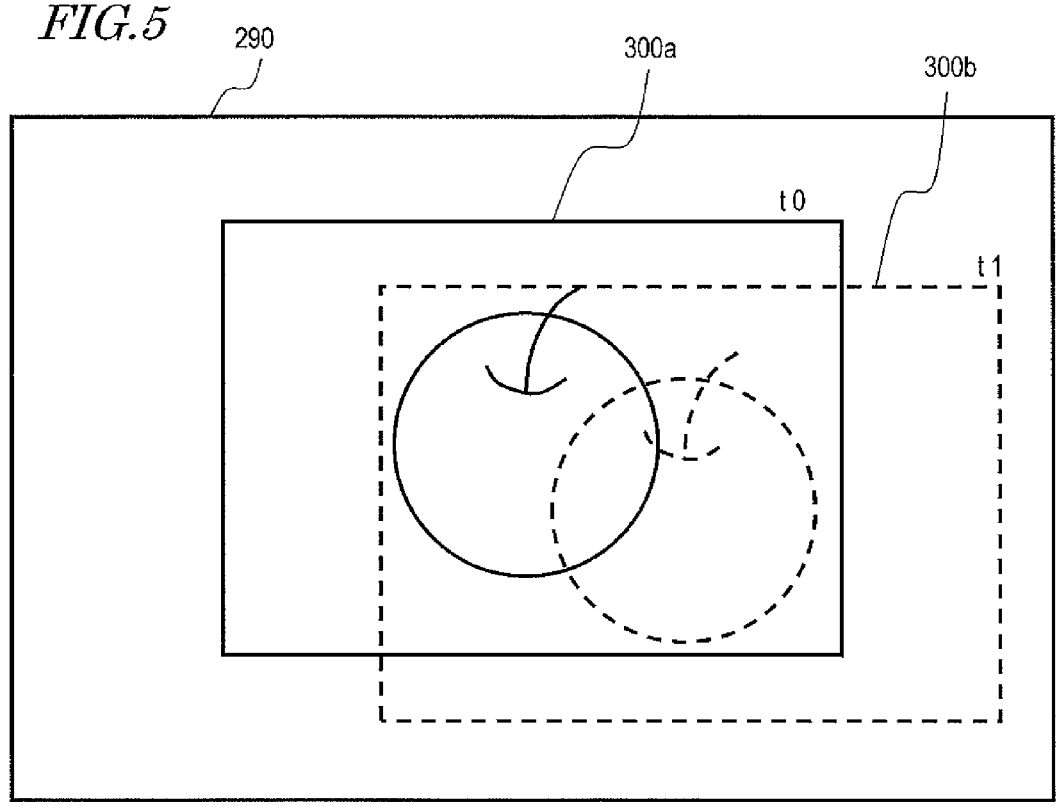
FIG. 5 is a schematic representation illustrating how to make electronic image stabilization.

FIG. 5 illustrates a relation between the entire image 290 represented by the output signal of the COD image sensor 180 and cropping ranges 300a and 300b. The CCD image sensor 180 outputs an image signal representing an image that has been captured with every imager and that is illustrated as the entire image 290 in FIG. 5. The digital camcorder 100 crops only a part of the entire image 290, and then either stores the cropped image on the memory card 240 or displays it on the LCD monitor 270. For example, the cropped image 300 is stored on the memory card 240 or displayed on the LCD monitor 270.

The image 300a drawn in the solid line was captured at a time t0. On the other hand, the image 300b drawn in the dashed line was captured at a time t1, which was ⅟₆₀ seconds later than the time t0.

The image processing section 190 can change the location of the cropping range 300 for use to output video in the entire image 290. If a shake was produced in the interval between the times t0 and t1, then the cropping range 300a of the entire image 290 may be changed into the cropping range 300b so as to cancel that shake. In this manner, the influence of the camera shake on the image shot can be reduced.

3. Image Stabilization Control

Hereinafter, the image stabilization control to get done by the digital camcorder 100 of this preferred embodiment will be described with reference to FIG. 6, which is a flowchart showing how the digital camcorder 100 gets the image stabilization control done. The series of images generated through the image stabilization control may be displayed on the monitor 270 and may also have its data compressed and stored in the memory card 240.

In this example, the digital camcorder 100 detects the shake by using, in combination, the gyrosensor 220 and the motion detection between multiple images shot as described above. Also, the digital camcorder 100 cancels the shake by using both of the optical and electronic image stabilization methods described above.

First of all, the user sets this digital camcorder 100 into a shooting mode by operating the user interface 250 (in Step S100). When set in the shooting mode, the digital camcorder 100 starts to cancel the shake that has been caused by the user's hand or body tremors.

To begin with, the controller 210 gets the output of the gyrosensor 220 as the angular velocity information in Step 5110, and makes an integration operation on the angular velocity information thus obtained for a predetermined period of time, thereby generating angle information.

Next, the controller 210 drives the OIS 140 in accordance with the gyro signal thus obtained so as to cancel the shake (in Step S120). That is to say, the controller 210 carries out the optical image stabilization in this processing step. However, if the camera shake is too significant, then the shake cannot be canceled completely, and therefore partially remains, even when the OIS 140 is driven to the limit of its predetermined range. On the other hand, if the camera shake is too subtle, then the shake cannot be detected by the gyrosensor 220 with such a low resolution, and therefore, partially remains, too. Likewise, if the camera shake has been produced in the translational direction, the gyrosensor 220 cannot detect such a shake, either, and the shake will also remain.

After having activated the OIS 140, the controller 210 compares the angle information that has been derived from the gyro signal obtained to a predetermined value (e.g., 0.3 degrees) in Step S130.

If the gyro signal obtained is greater than the predetermined value, the controller 210 determines the magnitude of the electronic image stabilization to make by reference to that gyro signal (in Step S140). Specifically, since a portion of the gyro signal that is less than the predetermined value has already been subjected to the optical image stabilization in Step S120, the rest of the gyro signal that is equal to or greater than the predetermined value is determined to represent the magnitude of the electronic image stabilization to make. Once the magnitude of the stabilization to make has been determined, the controller 210 instructs the image processing section 190 to make such an electronic image stabilization on the image shot (in Step S140).

Figure 7:
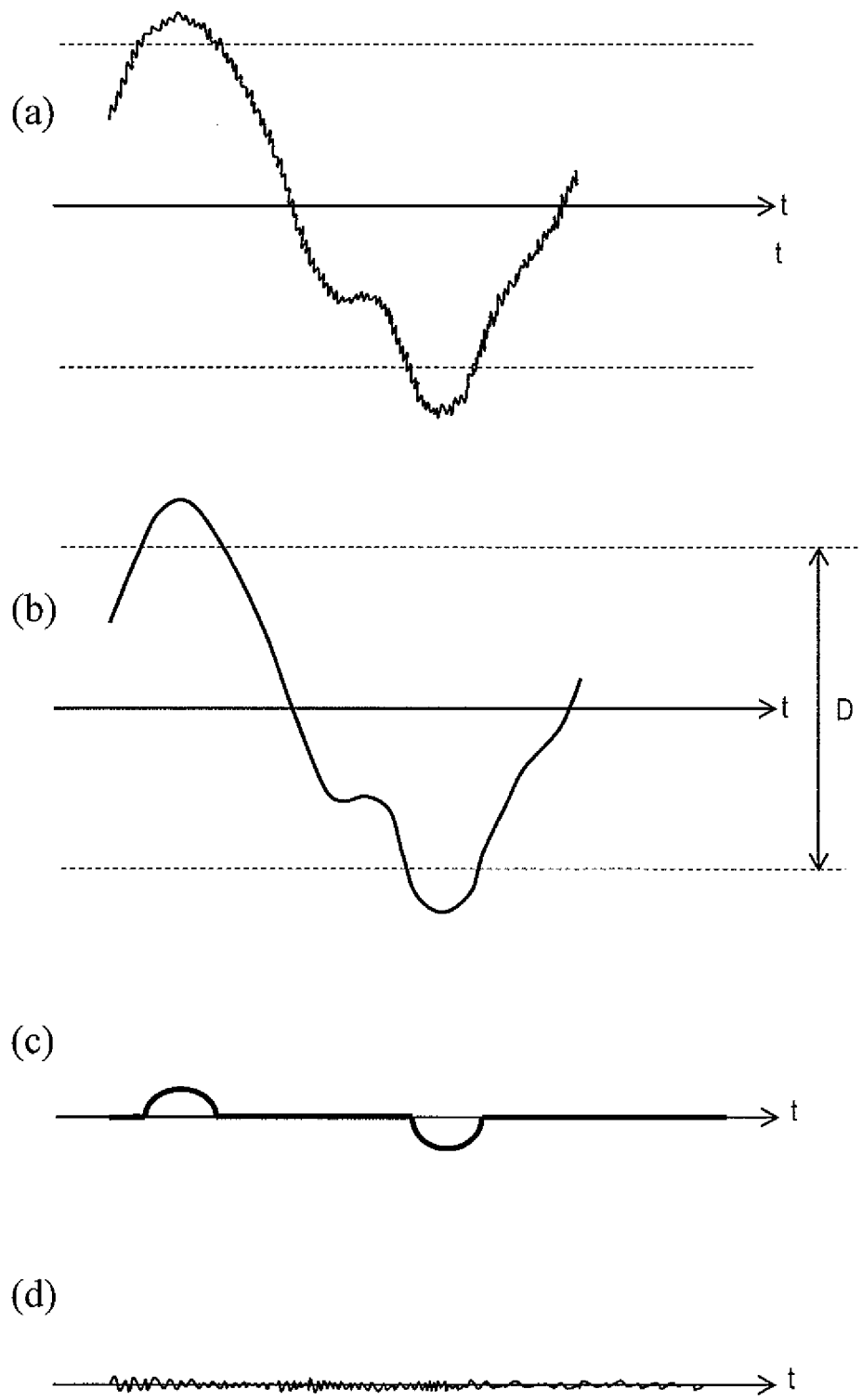
FIGS. 7(a) through 7(d) illustrate exemplary waveforms that are used in processing steps S110 through S140.

FIGS. 7(*a*) through 7(*d*) illustrate exemplary waveforms that are used in the processing steps S110 through S140 described above. Specifically, FIG. 7(*a*) illustrates a waveform representing the shake that has been actually given to the digital camcorder 100. In this waveform, a shake waveform with relatively low frequencies and a shake waveform with relatively high frequencies are superposed one upon the other. FIG. 7(*b*) illustrates a waveform representing the angular velocity information derived from the gyro signal that has been obtained in Step S110. The range D shown in FIG. 7(*b*) indicates an amplitude range in which the shake can be canceled with the OIS 140. That is to say, the amplitudes of the other portions that exceed this range D do fall within the detection range of the gyro signal but the shake represented by such a portion cannot be canceled completely by the optical image stabilization alone.

Figure 6:
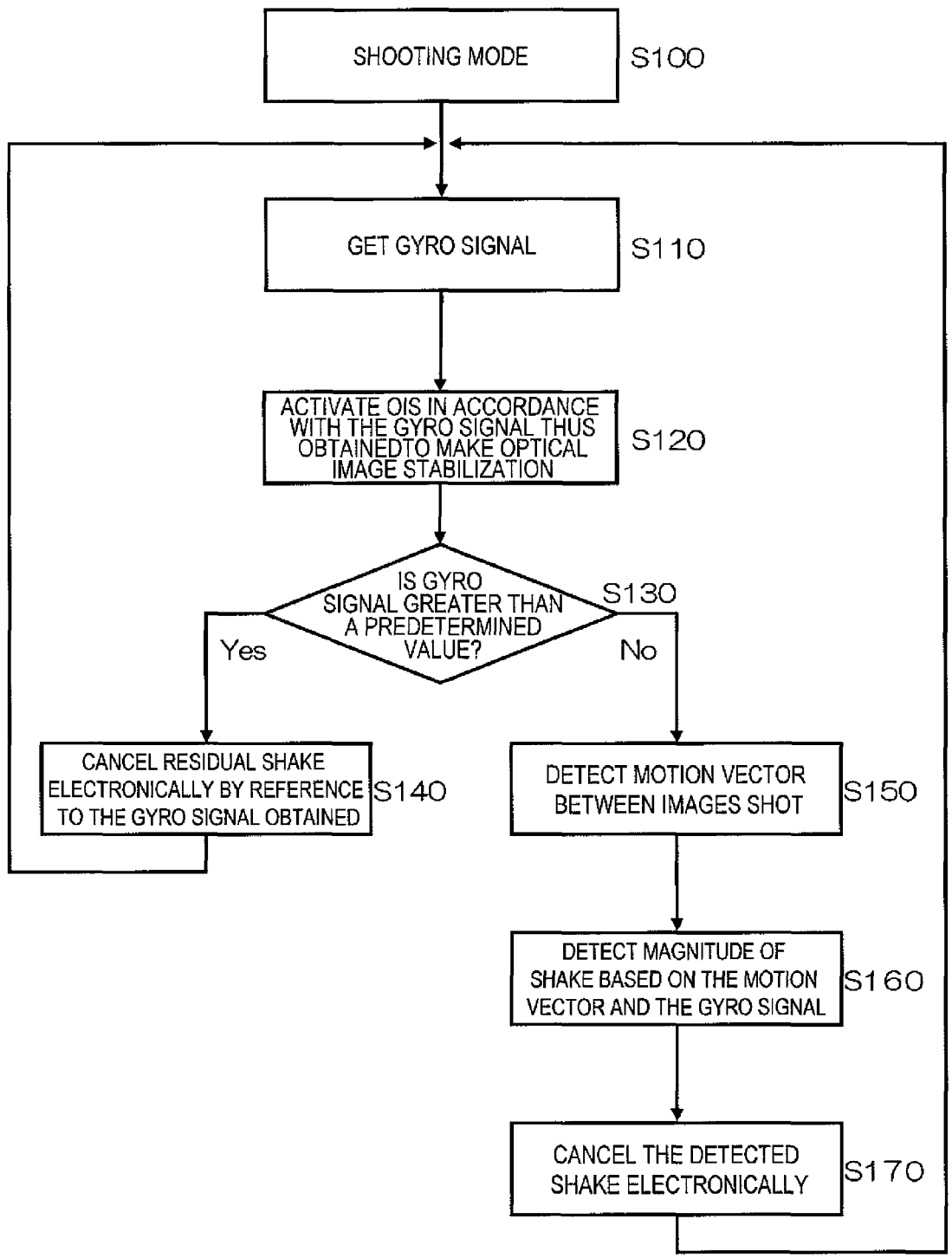
FIG. 6 is a flowchart showing how the digital camcorder 100 gets the image stabilization control done.

In such a situation, the optical image stabilization is carried out in Step S120 shown in FIG. 6. FIG. 7(*c*) illustrates what waveform will remain if a portion of the waveform representing the shake cancelable range D is removed from the waveform shown in FIG. 7(*b*). That is to say, the signal with the waveform shown in FIG. 7(*c*) has been generated based on the gyro signal. The waveform shown in FIG. 7(*c*) represents not only the shake that has been detected by the gyrosensor 220 and has been canceled successfully through the optical image stabilization control (i.e., portions with the zero amplitude) but also the shake that has been detected by the gyrosensor 220 and has failed to be canceled as a result of the optical image stabilization control (i.e., portions with non-zero amplitudes). That is to say, it can be said that the waveform shown in FIG. 7(*c*) represents the residual shake to be canceled that still remains after the optical image stabilization has been done.

The controller 210 is aware that there is such a residual shake with the waveform shown in FIG. 7(*c*). This means that the image generated is still affected by a shake that has not been canceled successfully but does persist as a result of the optical image stabilization. Thus, the controller 210 instructs the image processing section 190 to make electronic image stabilization on such an image that is still affected by the residual shake by reference to the signal shown in FIG. 7(*c*).

And FIG. 7(*d*) shows a result obtained by carrying out the electronic image stabilization using the waveform shown in FIG. 7(*c*). It can be seen that as for a shake with low frequencies, the camera shake has been canceled successfully beyond the cancelable range of the OIS 140. Meanwhile, a shake with high frequencies remains because the electronic image stabilization has been carried out in this case based on the gyro signal. This is the same as the reason why a shake with high frequencies remains on the waveform shown in FIG. 9(*c*). As will be described later with reference to FIG. 8(*d*), even such a shake with high frequencies can be almost canceled by carrying out the electronic image stabilization based on the motion of the subject image.

It should be noted that "by reference to the gyro signal obtained" in Step S140 shown in FIG. 6 means using the waveform shown in FIG. 7(*c*) that has been obtained based on the gyro signal waveform shown in FIG. 7(*b*).

Now let's go back to FIG. 6.

If the angle information derived from the gyro signal obtained turns out in Step S130 to be equal to or smaller than the predetermined value, the image processing section 190 detects a motion vector between the images shot and outputs the motion vector thus detected to the controller 210 (in Step S150). In response, the controller 210 compares the motion vector provided by the image processing section 190 to the gyro signal supplied from the gyrosensor 220, thereby determining the magnitude of the electronic image stabilization to make (in Step S160).

In this manner, the digital camcorder 100 compares the motion vector provided by the image processing section 190 to the gyro signal supplied from the gyrosensor 220. This comparison needs to be made for the following reasons. Specifically, if a motion detection is carried out based on the images shot, a motion vector is obtained no matter whether the motion has been caused by a camera shake or the subject's movement. On the other hand, if the shake is detected using the gyrosensor 220, a shake signal is obtained only when the camera has shaken in the rotating direction, no matter whether the subject has moved or not. Thus, if the magnitude of the motion represented by the motion vector is large but if the gyro signal supplied from the gyrosensor 220 has very small amplitude, then it is determined that only the subject have moved and the digital camcorder 100 not have. In that case, even if the electronic image stabilization were carried out, it should be difficult to improve the resultant image quality. That is why in such a situation, the controller 210 instructs the image processing section 190 not to make the electronic image stabilization. On the other hand, if the magnitude of the motion represented by the motion vector is relatively large and if the gyro signal supplied from the gyrosensor 220 also has relatively large amplitude, then it is determined that the digital camcorder 100 have moved. In that case, the controller 210 instructs the image processing section 190 to make the electronic image stabilization.

For that reason, by comparing the gyro signal to the motion vector, the chances of taking the subject's movement for a camera shake can be reduced significantly. Once the magnitude of the image stabilization has been determined, the controller 210 instructs the image processing section 190 to make electronic image stabilization on the images shot (in Step S170).

Figure 8:
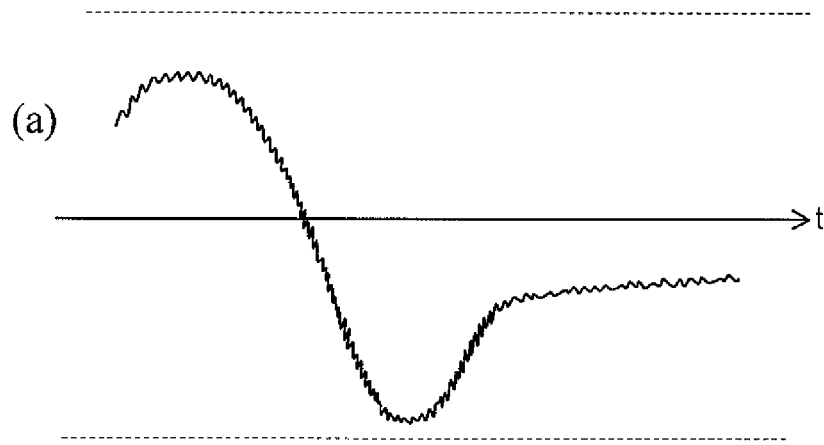
FIGS. 8(a) through 8(d) illustrate exemplary waveforms that are used in processing steps S110 through S170.
Figure 8:
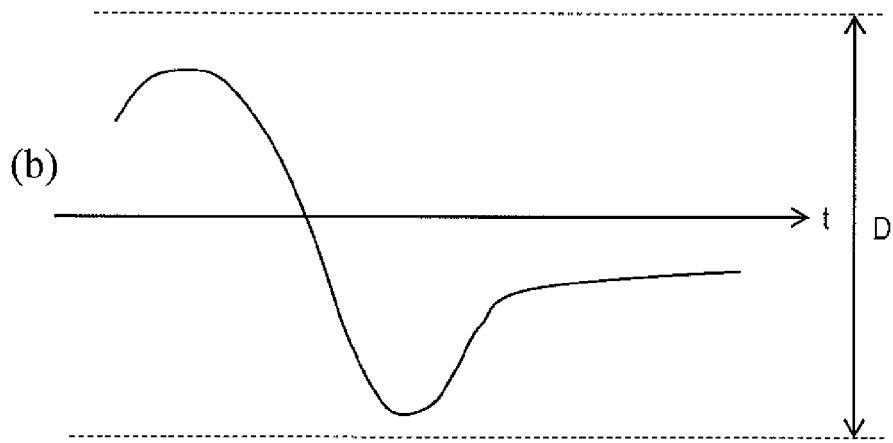
Figure 8:
Figure 8:

FIGS. 8(*a*) through 8(*d*) illustrate exemplary waveforms that are used in the processing steps S110 through S170 described above. Specifically, FIG. 8(*a*) illustrates a waveform representing the shake that has been actually given to the digital camcorder 100. In this waveform, a shake waveform with relatively low frequencies and a shake waveform with relatively high frequencies are superposed one upon the other. FIG. 8(*b*) illustrates a waveform representing the angular velocity information derived from the gyro signal that has been obtained in Step S110. The range D shown in FIG. 8(*b*) indicates an amplitude range in which the shake can be canceled with the OIS 140. In the example illustrated in FIG. 8(*b*), the amplitude of the camera shake falls within the shake cancelable range of the OIS 140. And as a result of the optical image stabilization that has been carried out in Step S120 shown in FIG. 6, some shake still remains as represented by the waveform shown in FIG. 8(*c*).

Then, the process advances from the processing step S130 to the series of processing steps that starts with the processing step S150. In Steps S150 and S160, the controller 210 compares the subject's motion vector, which has been detected based on multiple images shot, to the gyro signal, thereby determining the magnitude of the electronic image stabilization to make. FIG. 8(*d*) illustrates what waveform is obtained by making the electronic image stabilization to the specified magnitude. It can be seen from FIG. 8(*d*) that not just the shake with low frequencies but also the shake with high frequencies have been canceled as well.

As described above, when determining the magnitude of the electronic image stabilization to make, the digital camcorder 100 of this preferred embodiment determines, according to the magnitude of its own shake, whether the camera shake needs to be canceled optically using the gyrosensor 220 or electronically using a number of images shot. That is why even if the amplitude of the camera shake detected is too small, such a subtle shake that would otherwise be too small to be detected for the gyrosensor 220 with a normal resolution can also be detected and canceled according to this preferred embodiment.

Also, the digital camcorder 100 of this preferred embodiment makes the electronic image stabilization in order to cancel the residual shake that remains even after the optical image stabilization has been done. When determining the magnitude of the electronic image stabilization to make, the digital camcorder 100 of this preferred embodiment determines, according to the magnitude of its own shake, whether the camera shake needs to be canceled optically using the gyrosensor 220 or electronically using a number of images shot. That is why even if the amplitude of the camera shake detected is too small, such a subtle shake that would otherwise be too small to be detected for the gyrosensor 220 with a normal resolution can also be detected and canceled according to this preferred embodiment. Conversely, if the amplitude of the camera shake detected is too large, even the residual shake that should exceed the shake cancelable range when the OIS 140 is just driven normally can also be canceled according to this preferred embodiment.

Although preferred embodiments of the present invention have been described, those embodiments are just examples and the present invention is in no way limited to those specific preferred embodiments but may be readily modified. Thus, not only modified examples of those preferred embodiments but also other modified examples falling within the scope of the present invention will be described.

Specifically, the optical system and drive system of the digital camcorder 100 to which the present invention is applied are not limited to the ones shown in FIG. 1. For example, in the preferred embodiment illustrated in FIG. 1, the optical system is supposed to consist of three groups of lenses. However, the optical system may also consist of any other groups of lenses. Furthermore, each of the lenses may be either a single lens or a group of multiple lenses.

Also, in the preferred embodiments of the present invention described above, the imager is supposed to be the CDD image sensor 180. However, the present invention is in no way limited to those specific preferred embodiments. Alternatively, the imager may also be a CMOS image sensor or an NMOS image sensor.

Furthermore, in the preferred embodiment described above, the residual shake that has not been quite canceled by the optical image stabilization is supposed to be canceled by making the electronic image stabilization. However, the present invention is in no way limited to that specific preferred embodiment. For example, the present invention is also applicable to a device that makes only the electronic image stabilization.

In the processing step S140 shown in FIG. 6, the image stabilization control is supposed to be carried out using only the signal that has been generated based on the output signal of the gyrosensor 220. Optionally, however, the camera shake may also be detected by detecting the motion of the subject image and using the motion vector thus obtained. In that case, the shake with low frequencies may be canceled in Step S140 by making the electronic image stabilization and then the shake with high frequencies (see FIG. 7(*d*)) can be canceled by detecting the motion after that. Since the motion detection processing has already been described in detail, the description thereof will be omitted herein.

Furthermore, in the preferred embodiment described above, the modes of image stabilization are supposed to be changed, depending on whether or not the magnitude of the shake detected by the gyrosensor 220 is greater than the predetermined value, from the mode of canceling the shake detected by the gyrosensor 220 into the mode of canceling the shake that has been detected based on images shot, or vice versa. However, this is only an example of the present invention and does not always have to be adopted. Alternatively, the modes of image stabilization may also be changed from the mode of canceling the shake detected by the gyrosensor 220 into the mode of canceling the shake that has been detected based on images shot, or vice versa, depending on whether or not the magnitude of the shake detected based on the images shot is smaller than a predetermined value.

In the preferred embodiments described above, the image capture device of the present invention is supposed to be a digital camcorder. However, the present invention may also be carried out as a digital still camera. This is because more and more digital still cameras of today have the movie shooting function and include the gyrosensor 220. It should be noted that the modes of shooting to which the present invention is applicable include not only the movie shooting mode but also a sequential shooting mode as well. The reason is that a digital still camera with the sequential shooting mode can detect a motion based on multiple images shot when making electronic image stabilization.

The present invention can be used effectively in digital camcorders, digital still cameras, and various other image capture devices.

What is claimed is:

1. An image capture device comprising:
   an optical system for producing a subject image;
   an imager, which receives the subject image and outputs a signal representing an image including the subject image;
   a sensor for detecting shake of the device itself by a movement of the device, independent of the subject image; and
   an image processing section, which receives the signal representing the image and crops and outputs a part of the image and which changes a cropping range of the image, thereby reducing shakiness of the subject image in the image that has been caused by the shake of the device itself,
wherein the image processing section determines, as a function of magnitude of the shake of the device itself that has been detected by the sensor, whether the cropping range of the image needs to be changed based on the shake of the device itself that has been detected by the sensor, or based on the motion of the subject image determined by image analysis of the subject image.

2. The image capture device of claim 1, wherein if the shake of the device itself that has been detected by the sensor is greater than a predetermined value, the image processing section changes the cropping range of the image based on the shake of the device itself that has been detected by the sensor, and
wherein if the shake of the device itself that has been detected by the sensor is equal to or smaller than the predetermined value, the image processing section changes the cropping range of the image based on the motion of the subject image.

3. The image capture device of claim 2, wherein if the shake of the device itself that has been detected by the sensor is equal to or smaller than the predetermined value,
the imager outputs signals representing a plurality of images, and
the image processing section detects the motion of the subject image using the plurality of images and changes the cropping range of the image based on the motion of the subject image.

4. The image capture device of claim 3, further comprising a control section that determines, by the motion of the subject image and based on the shake of the device itself that has been detected by the sensor, whether the image processing section needs to perform the processing of reducing the shakiness of the subject image in the image.

5. The image capture device of claim 2, wherein if the shake of the device itself that has been detected by the sensor is greater than the predetermined value,
the imager outputs signals representing a plurality of images, and
the image processing section detects the motion of the subject image using the plurality of images and changes the cropping range of the image based on not only the shake of the device itself that has been detected by the sensor but also the motion of the subject image.

6. The image capture device of claim 2, further comprising a stabilizer that performs the processing of reducing the shakiness of the subject image in the image that has been caused by the shake of the device itself by shifting an optical axis of the optical system based on the shake of the device itself that has been detected by the sensor.

7. A method for generating an image using an image capture device that includes an optical system, an imager and a sensor, the method comprising the steps of:
producing a subject image using the optical system;
receiving the subject image at the imager and generating a signal representing an image including the subject image;
detecting shake of the image capture device by a movement of the device itself, independent of the subject image, using the sensor; and
reducing shakiness of the subject image in the image that has been caused by the shake of the device itself and outputting a less shaky subject image by changing a cropping range of the image generated,
wherein the step of reducing the shakiness of the subject image includes determining, as a function of magnitude of the shake of the device itself that has been detected by the sensor, whether the cropping range of the image needs to be changed based on the shake of the device itself that has been detected by the sensor, or based on the motion of the subject image determined by image analysis of the subject image.

8. A computer program, stored on a non-transitory computer-readable storage medium, to be executed by a computer of an image capture device that includes an optical system, an imager and a sensor,
wherein the computer program is defined to make the computer that executes the computer program perform the steps of:
producing a subject image using the optical system;
receiving the subject image at the imager and generating a signal representing an image including the subject image;
detecting shake of the image capture device by a movement of the device itself, independent of the subject image, using the sensor; and
reducing shakiness of the subject image in the image that has been caused by the shake of the device itself and outputting a less shaky subject image by changing a cropping range of the image generated,
wherein the step of reducing the shakiness of the subject image includes determining, as a function of magnitude of the shake of the device itself that has been detected by the sensor, whether the cropping range of the image needs to be changed based on the shake of the device itself that has been detected by the sensor, or based on the motion of the subject image determined by image analysis of the subject image.

9. An image capture device comprising:
an optical system for producing a subject image;
an imager, which receives the subject image and outputs a signal representing an image including the subject image;
a sensor for detecting shake of the device itself by a movement of the device, independent of the subject image; and
an image processor configured to determine, as a function of magnitude of the shake of the device itself that has been detected by the sensor, whether processing of reducing shakiness of the subject image in the image that has been caused by the shake of the device itself needs to be changed based on the shake of the device itself that has been detected by the sensor, or based on the motion of the subject image determined by image analysis of the subject image.

10. The image capture device of claim 9, wherein the processing of reducing shakiness of the subject image is performed by changing a cropping range of the image,
wherein if the shake of the device itself that has been detected by the sensor is greater than a predetermined value, the image processor changes the cropping range of the image based on the shake of the device itself that has been detected by the sensor, and
wherein if the shake of the device itself that has been detected by the sensor is equal to or smaller than the predetermined value, the image processor changes the cropping range of the image based on the motion of the subject image.

* * * * *